United States Patent
Mullaly et al.

(10) Patent No.: US 6,304,909 B1
(45) Date of Patent: Oct. 16, 2001

(54) CLIENT-CONTROLLED LINK PROCESSING IN COMPUTER NETWORK

(75) Inventors: John Martin Mullaly, Austin; Scott Harlan Isensee, Georgetown, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,704

(22) Filed: Dec. 18, 1998

(51) Int. Cl.[7] ........................................ G06F 13/00
(52) U.S. Cl. ............................. 709/232; 709/230
(58) Field of Search ............................ 709/232, 230, 709/235, 203

(56) References Cited

U.S. PATENT DOCUMENTS

| | | | | |
|---|---|---|---|---|
| 5,504,894 | * | 4/1996 | Ferguson et al. ........................ | 707/2 |
| 5,724,514 | * | 3/1998 | Arias ....................................... | 709/235 |
| 5,913,041 | * | 6/1999 | Ramanathan et al. ................. | 709/233 |
| 5,953,506 | * | 9/1999 | Kalra et al. ............................. | 709/231 |
| 6,078,919 | * | 6/2000 | Ginzburg et al. ....................... | 707/10 |
| 6,223,221 | * | 4/2001 | Kunz ....................................... | 709/224 |

* cited by examiner

Primary Examiner—Kenneth R. Coulter
(74) Attorney, Agent, or Firm—Leslie A. Van Leeuwen; Bracewell & Patterson, L.L.P.

(57) ABSTRACT

A computer network such as the internet has servers to deliver pages of data to remote users upon demand, and these pages usually contain links to further pages. The request for data is in the form of a page address sent by the user, identifying a specific page, usually by a "URL". The server has the ability to generate context-sensitive information about delivery of this page, including current loading at the server, transmission bandwidth for the server, and size of the data requested. The server can calculate the time needed to transfer the requested data, and send this information to the client. The user can then decide the transfer method desired, based on the information sent by the server. For example, the user may want immediate transfer, or delayed transfer, or may want to abort the request. The requested page may be sent later by email. The server may send this context-sensitive information for all of the links on a page, and the user station may display the information for a link when it is clicked, in one embodiment. In this manner, receipt of information can be selective, based on user's needs and network delays.

20 Claims, 3 Drawing Sheets

CLIENT-CONTROLLED LINK PROCESSING IN COMPUTER NETWORK

RELATED CASES

This application discloses information also disclosed in the following application, filed herewith and assigned to the assignee of this application:

Ser. No. 09/215,703, filed Dec. 18, 1998, now abandoned, for "Anticipatory Push for Data in Computer Network," by Scott Isensee et al.

BACKGROUND OF THE INVENTION

1. Technical Field

This invention relates to computer networks, and more particularly to sending and retrieving data by the internet.

2. Description of the Related Art

Retrieving data from remote servers by the internet is impeded by the delays often encountered between the time data is requested and the time when it has been retrieved and is available for display. Users spend a lot of time waiting. The download time can vary significantly depending on several factors, including server load, the transmission bandwidth from the server to the client, and the amount of data to be downloaded; as such, this very pertinent information is context-sensitive.

Network traffic is not well distributed. At one time, a user will select a link from a hypertext document on the screen, and for a time there is heavy communication on the network between the user and the server. The user may wait for an annoyingly long period as the new page of data is downloaded. The user then reads the new page while the communication path between client and server remains idle; the server may indeed be doing no work if there are no other pending requests from other users. It would be desirable to even out this load so that the network is used a greater percentage of the time; this could provide a mode of operation where data is available when the user is ready for it, and thus the user spends less time waiting.

In an effort to speed up the delivery of data via networks, the speed and bandwidth of these networks has been greatly increased. An increase in speed and bandwidth of course results in faster delivery of requested data. However, this is a great cost in view of the extensive hardware upgrades needed. And part of this increase in cost is needless, if the delivery could be spread out in time so that loading on the network is more even, rather than in short bursts of large blocks of data. And, due to the ever-increasing number of users, the same result is soon obtained, i.e., long delays experienced by users yet sporadic loading of the network.

Many advances have been made in factors influencing user delay, such as compression of data so that less need be downloaded to present a given page of data, and caching of data on local or intermediate servers or stations so that it is more unlikely that bottlenecks will be encountered. Nevertheless, increases in the number of users and volume of information available and the volume of data per page has resulted in delays which keep occurring in spite of vast increases in delivery speed and technique.

A previously-used way of avoiding the problem of delays in viewing data requested via the internet is to use a program that will download all of the pages linked to a web page whenever this page is requested. However, this method unnecessarily loads the servers and network since excessive transmission of unneeded pages occurs.

Currently, most links provide no indication of response time. Some download files are posted with their file size listed, or offer an estimated download time based on hypothetical context. Also, users can install products such as the IBM "Web Browser Intelligence" product, which provides some degree of proxy of the server, but these simply provide an indication of whether the server for a link is accessible, and, if so, whether the net transmission time is "normal" or "relatively slow." There is no accurate, context-sensitive information about the time required to resolve a link.

SUMMARY OF THE INVENTION

It is therefore one object of the present invention to provide an improved method of sending and receiving data over a computer network.

It is another object of the present invention to provide an improved and more efficient method for retrieving pages of data from remote locations via the internet, particularly a method which allows the user to select actions when there are delays in viewing data from a remote server.

It is yet another object of the present invention to provide an improved way of more efficiently viewing or using data retrieved by a computer network, without requiring increases in speed or bandwidth of the network hardware itself.

An additional object of the invention to provide a way of presenting context-sensitive information about the ability to retrieve information from a remote server in a network environment so that a user can decide on an preferred method of receiving the information from the server.

The above objects are separate and distinct from one another; all such objects as well as additional objects, features, and advantages of the present invention will become apparent in the following detailed written description.

According to one embodiment of the invention, a computer network such as the internet has servers to deliver pages of data to remote users upon demand, and these pages usually contain links to further pages. The request for data is in the form of a page address sent by the user, identifying a specific page, usually by a "URL." The server has the ability to generate context-sensitive information about delivery of this page, including current loading at the server, transmission bandwidth for the server, and size of the data requested. The server can calculate the time needed to transfer the requested data, and send this information to the client. The user can then decide the transfer method desired, based on the information sent by the server. The browser may have default or user-selected settings specifying what transfer method to use for sending the requested information from the server, e.g., a setting which specifies: if there will be more than a 30-second wait to transfer a requested page, ask the server to send the page via email and give the user a message informing them of this. Thus, the user station can specify immediate transfer, or delayed transfer, or may abort the request. The requested page may be sent later by email. The server may send the context-sensitive information for all of the links on a page, and the user station may display the information for a link when it is clicked, in one embodiment. In this manner, receipt of information can be selective, based on user's needs and network delays.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
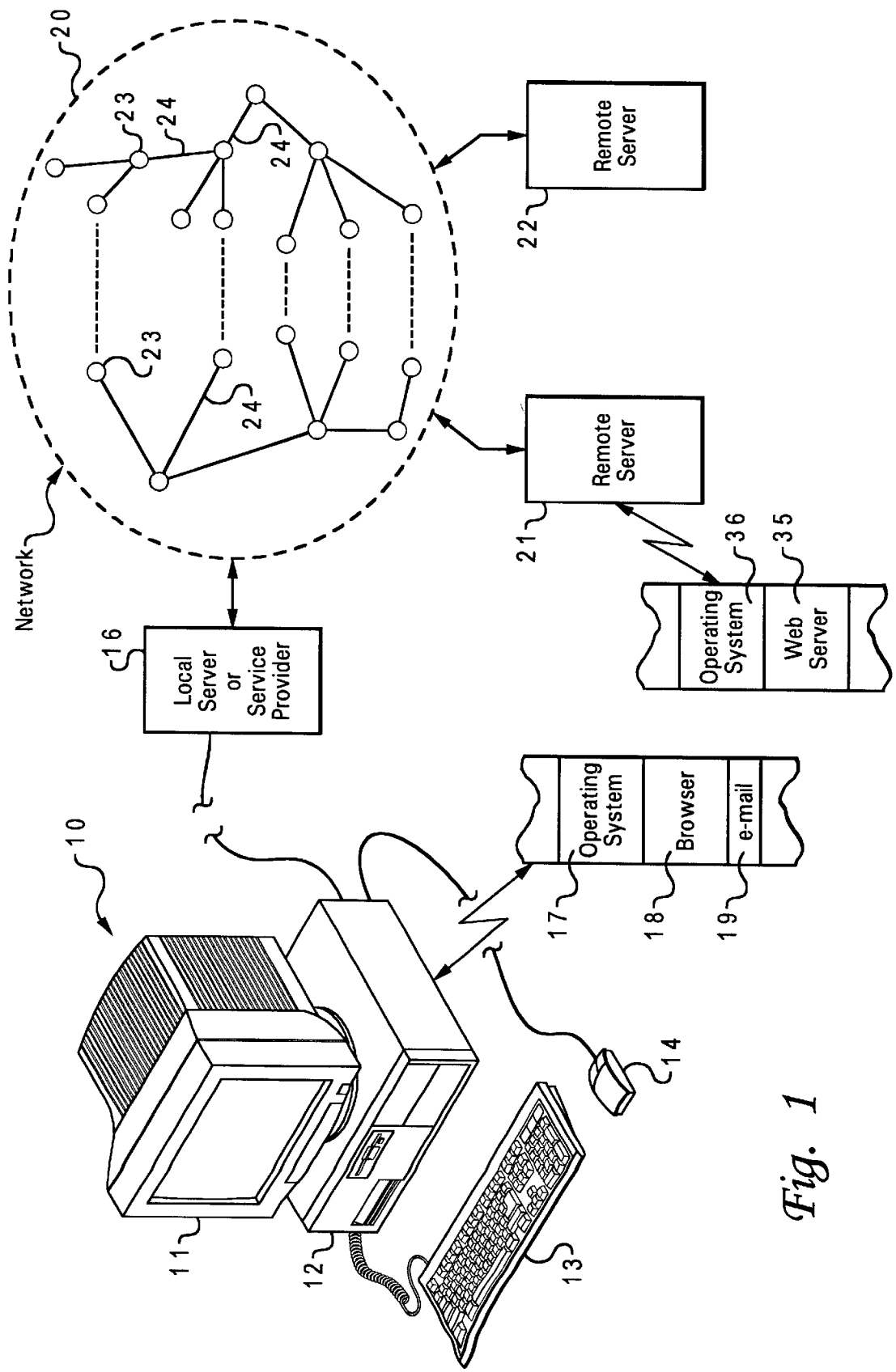
FIG. 1 is an electrical diagram in block form of a computer network which may use the features of the present invention.

Referring to FIG. 1, a network system is shown which may use concepts of the invention. A computer station 10 is employed by the user to obtain information from a network such as the internet. The computer station 10 includes a monitor 11, a system unit 12, keyboard 13, mouse 14, in the usual manner. The system unit contains a CPU and system memory, and an adapter card or modem for connection to a network. For example, the station 10 may be connected by a modem and a phone line 15 or cable to an internet server 16 or service provider. The system memory contains an operating system 17, e.g., AIX, UNIX, Windows, etc., and an applications program for accessing the network, such as an HTTP-compliant web browser 17 such as Netscape Navigator®, as well as an email client 19 which supports simple mail-transfer protocol (SMTP) used for e-mail. The server 16 or service provider is connected to the internet 20, or network of this type. Thus, the computer station 10 is able to send and receive messages to other stations on the network 20, and to retrieve information from the network or internet 20, using standard internet connections and applications software.

The internet 20 allows the user at station 10 to link with other servers and networks such as stations 21 and 22 to retrieve vast amounts of information. The term internet refers to the collection of networks and gateways 23 and 24 that utilize the TCP/IP suite of protocols. TCP/IP is an acronym for "Transport Control Protocol/Interface Program," a software protocol for communication between computers: The internet 20 is a system of geographically distributed computer network 23 interconnected by computers executing networking protocols allowing users to interact and share information over the networks. The internet has evolved as an "open" system for which developers can design software applications for performing specialized operations or services, essentially without restriction.

Figure 2:
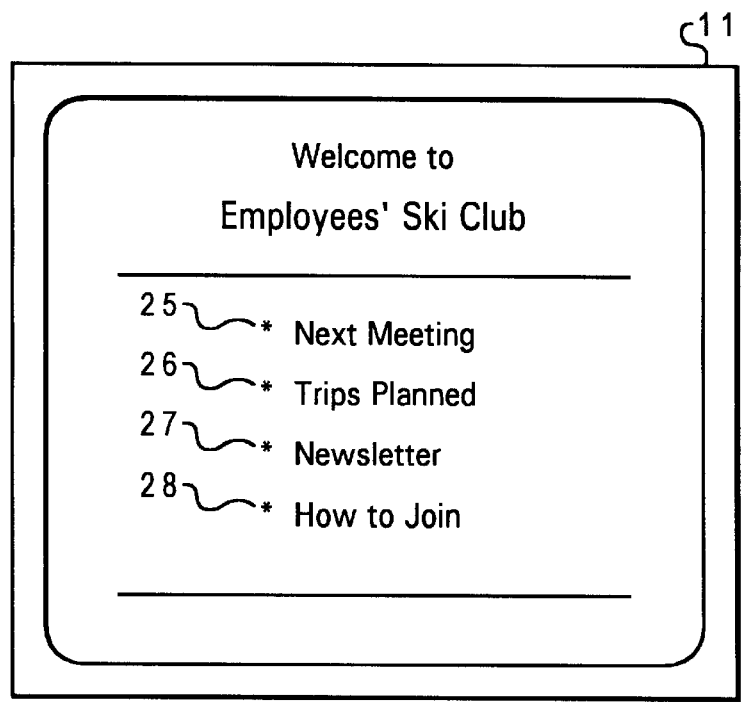
FIG. 2 is a view of the video display at the user station as in the system of FIG. 1, showing a typical web page.

Referring to FIG. 2, a hypertext document is illustrated as an example. Information transferred between stations and networks on the internet 20 is usually presented in hypertext, a format in which text, images, sounds, and actions are linked together in a complex non-sequential web of associations that permit the user to browse or navigate through related topics, regardless of the presented order of the topics. These links are often established by both the author of a hypertext document and by the user, depending on the intent of the hypertext document. In FIG. 2, a fictional example, the home page or first page for Employee's Ski Club, and is reached by URL <http://www.employees_ski_club.com/index.html>. The page is merely the display of a text document in a file stored in a folder, on the server 21, identified by the file name given in the URL address. The text document for FIG. 2 is in HTML (hypertext markup language) format, as follows:

<html><head><title>Employees' Ski Club
    </title></head>
    <body    BGCOLOR="FFEBCD"    TEXT="400000"><center>
    <h2>Welcome To</h2><p><h1>Employees' Ski Club</h1><p>
    <hr size=4><h3>
    <A HREF="http://www.employees_ski_club.com/next_meeting.html">
    * Next Meeting</A><p>
    <A HREF="http://www.employees_ski_club.com/trips.html">
    * Trips Planned></A><p>
    <A HREF="http://www.employees_ski_club.com/newsletter.html">
    * Newsletter</A><p>
    <A HREF="http://www.employees_ski_club.com/join.html">
    * How to Join</A><p></h3>
    <hr size=4>
    </center></body></html>

Each one of the links 25–28 in FIG. 2 is highlighted on the screen by color or other means, and identifies another hypertext document stored on the server 21, having URLs and file names such as:

<http://www.employees_ski_club.com/next_meeting.html>
    <http://www.employees_ski_club.com/trips.html>
    <http://www.employees_ski_club.com/join.html>
    <http://www.employees_ski_club.com/newsletter.html>

Figure 3:
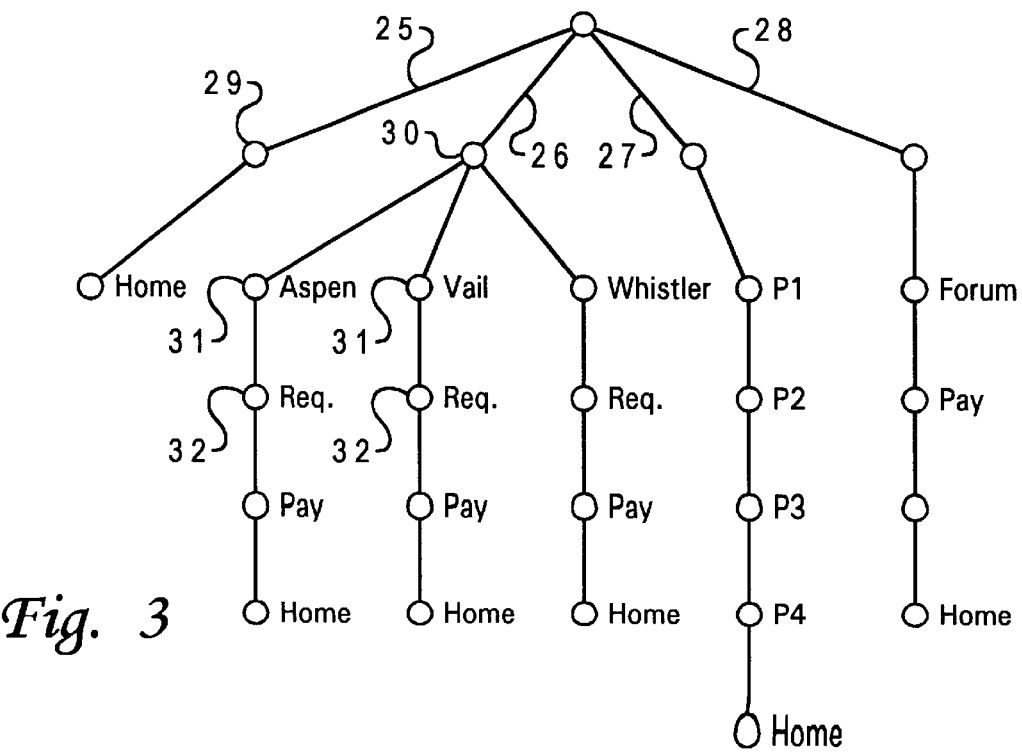
FIG. 3 is a tree diagram of the web pages such as that of FIG. 2, in an example web site at a server in the system of FIG. 1.

When the user clicks on a link 25–28, the URL for the linked document is requested by the browser. Each one of these linked documents, when retrieved and displayed, shows other links to follow-up documents, producing a tree structure as seen in FIG. 3. Clicking on the "Next Meeting" link 25 causes a link to a page 29, producing a page giving details of the next meeting, and such page will have perhaps other links like "Return to Home Page" or links to URLs for details about something on the Next Meeting page. In similar maimer, clicking on the "Trips" link 26 calls up a page 30 which might have a number of further links 31 to pages having details about particular trips, then those pages have links 32 to pages to sign-up for each of these trips. The "Join" link 27 may call up a succession of linked pages giving information and asking for "Name", "Address," etc. The "Newsletter" link 28 may call up a succession of pages for a multiple-page newsletter, and of course this may have links to other details, and links to return to home page.

The usual way of operating would require the user to click on each link when he was ready to view it, and the browser software in the user's computer station 10 would send out a URL for this link, and wait while the request is sent to the remote server, the page is retrieved and sent out by the server, and data makes its way back to the user station via the internet 20. Meanwhile, the user waits.

Figure 4:
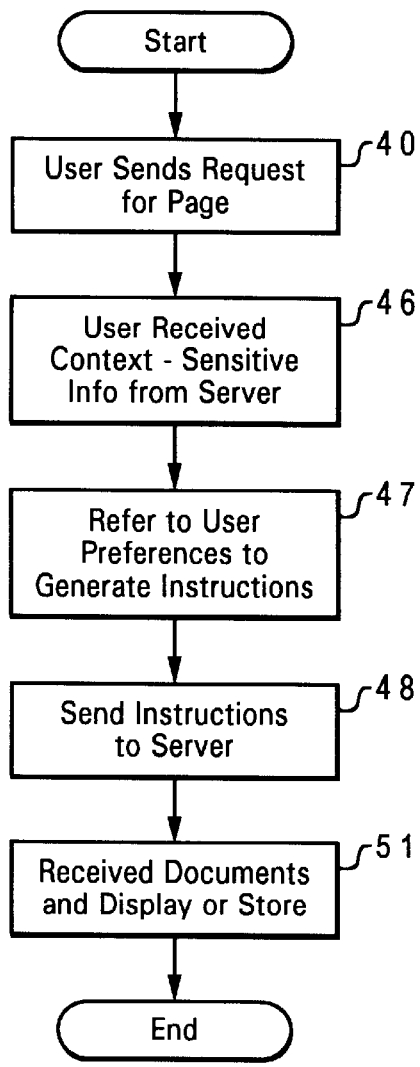
FIG. 4 is a logic flow chart of the method employed at a user station, according to one embodiment of the invention.
Figure 5:
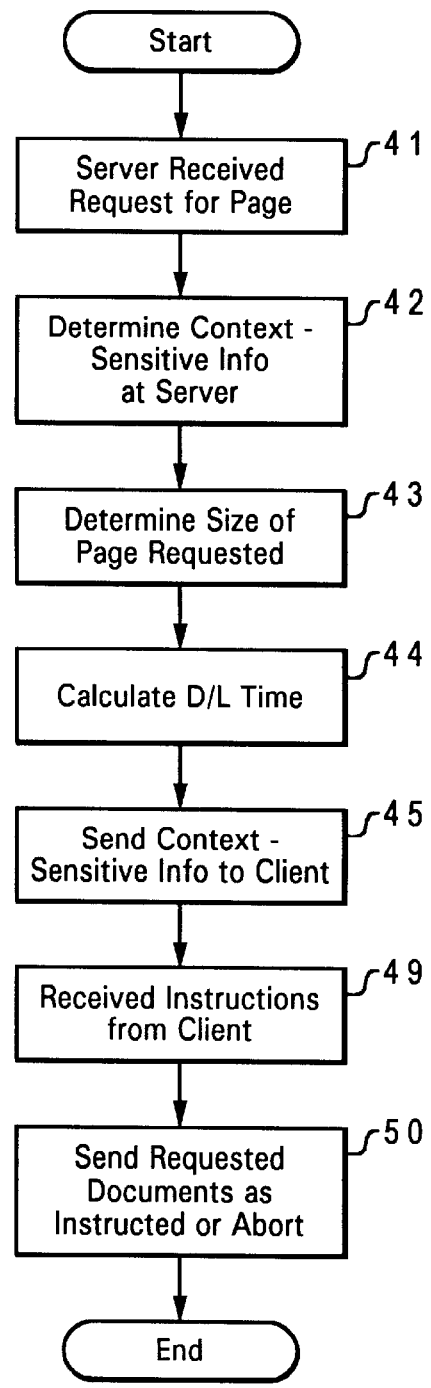
FIG. 5 is a logic flow chart of the method employed at the server for sending context-sensitive information, according to the embodiment of the invention of FIG. 4.

According to the invention, methods are provided to reduce the apparent latency or delay in downloading and viewing pages of data via the internet. The web server 21 storing the page of FIG. 2 can provide context-sensitive information to clients such as user station 10. The web server 21 is a computer executing a web server software application 35 over an operating system 36 as seen in FIG. 1. The web server software 35 allows the server 21 to respond to receipt of a request for a given page, identified by a URL, by sending all of the parts of this page over the net to the user station 10. The page may include html text as seen above, gif or jpg files for images, as well as Java applets, etc. In addition, or in place of, just sending a requested page to the user, the server software (and browser) includes functions to be explained in reference to FIG. 4 and FIG. 5. These functions include gathering of information at the server about the quality of transfer at the present time from this server 21 to the user station 10. The information can include an indication of server load, or real-time context-sensitive estimates of download time. In one example, a web page such as the page of FIG. 2 contains a mechanism such as a Java applet or Java script which allows the browser 18 to periodically query the server(s) of links 26–29 embedded in the page. The server 21 where the page is stored for access contains a client proxy, which is a means for the server to track all client queries. The client proxy continuously determines the load at server 21 by tracking delays in responses and in sending data. In one embodiment, illustrated in FIG. 4 and FIG. 5, a user sends out a request for a specific page, e.g., by clicking on a link or URL, see block 40, FIG. 4. The server 21 receives the request, block 41 of FIG. 5, and determines real-time context-sensitive information, e.g., server load and bandwidth available, block 42. Also, the server determines the size of the page or other data that is being requested, block 43. Next, the server calculates the delay or download time, block 44, and sends this information to the client, block 45. The user station 10 receives the context-sensitive information from the server 21, block 46 of FIG. 4, and refers to user preferences stored at the user station to generate a response to the server, block 47. The user preferences may be default settings or may be selected by a user from a menu during set-up; for example, a setting which specifies: if there will be more than a 30-second wait to transfer a requested page, ask the server to send the page via email and send the user station a message informing it of this. Thus, the user station can specify immediate transfer, or delayed transfer, or may send instructions to abort the data request. Instructions are sent to the server by the user station, block 48, and received at the server 21, block 49. The server responds to the user's instructions by (a) sending the data immediately, (b) sending the data at a specified time later, (c) sending the data by email and sending a message advising of this, or (d) aborting the request, block 50. The user station receives the data (if sent) and displays it or stores it in a folder, according to its request, block 51.

In another embodiment, the server can generate context-sensitive information for each of the links 25–28 when a page such as the page of FIG. 2 is requested. This information can be sent to the client as part of the data for the requested page, or as a separate message. The user preferences may say that any link that would take less than 20-seconds should be navigated normally, but links that would take more than 20-seconds should be queued for later retrieval.

The server 21 may send data identified by the links 25–28 using the anticipatory push method of the above-identified application Ser. No. 09/215,703, filed Dec. 18, 1998, now abandoned, which is incorporated herein by reference. That is, when context-sensitive information is gathered for each link 25–28, the user-preference information may be made available to the server via a message or in the original request for the FIG. 2 page, and the server 21 may proceed to send data for links 25–28 by push technology for each instance that the user preferences are met, rather than waiting for the user station 10 to request the next page by clicking on a link. For example, if the 30-second rule is specified, then long pages that predictions were that more than 30-seconds would be required to send, would not be sent, but others would if the probability of request criteria were met.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

What is claimed is:

1. A computer network having a first station and a second station, the first and second stations being separated from one another and coupled by said network, comprising:
    a request mechanism at said first station for requesting data from said second station;
    a reply mechanism at said second station for sending to said first station in response to a said request an indication of time-delay conditions for transfer of data from said second station;
    a selection mechanism in said first station for sending instructions to said second station based on said indication, said instructions identifying a transfer method for said data.

2. A computer network according to claim 1 wherein said first station is a user station, said second station is a remote server, and said network is the internet.

3. A computer network according to claim 1 wherein said network is the internet and uses TCP/IP and hypertext transmission protocols, and said data includes pages identified by universal resource locator addresses.

4. A computer network according to claim 3 wherein said indication is based on size of said data, loading at said second station, and transmission bandwidth for said second station.

5. A computer network according to claim 4 wherein said transfer method includes a plurality of alternatives, said alternatives including immediate transfer, delayed transfer, and aborting transfer.

6. A computer network according to claim 3 wherein said data includes a page of hypertext, and said indication is sent to said first station by said second station for all links in said hypertext.

7. A computer network according to claim 6 wherein said first station sends instructions to said second station for each of said links in said hypertext.

8. A method of operating a computer network of the type having a first station and a second station, the first and second stations being separated from one another and coupled by said network, comprising the steps of:
    sending a request for data from said first station to said second station;
    sending from said second station to said first station in response to a said request an indication of time-delay conditions for transfer of data from said second station; and
    sending instructions from said first station to said second station based on said indication, said instructions identifying a transfer method for said data.

9. A method according to claim 8 wherein said first station functions as a user station, said second station functions as a remote server, and said network uses internet protocol.

10. A method according to claim 8 wherein said network is the internet and uses TCP/IP and hypertext transmission protocols, and said data includes pages identified by universal resource locator addresses.

11. A method according to claim 10 wherein said indication is generated based on size of said data, loading at said second station, and transmission bandwidth for said second station.

12. A method according to claim 11 where said transfer method includes a plurality of alternatives, said alternative including immediate transfer, delayed transfer, and aborting transfer.

13. A method according to claim 10 wherein said data includes a page of hypertext, and said indication is sent to said first station by said second station for all links in said hypertext.

14. A method according to claim 13 wherein said first station sends instructions to said second station for each of said links in said hypertext.

15. A program product residing in computer memory in a computer system for providing delivery of data from a server on a network, wherein said data is displayed by a graphic interface at a user station, said program product comprising:

transfer means to send from said user station to said server a request for a page of said data;

receiving means to receive from said server in response to a said request an indication of time-delay conditions for transfer of data from said server;

said transfer means including means for sending instructions from said user station to said server based on said indication, said instructions identifying a transfer method for said data; and signal-bearing media bearing said transfer means and said receiving means.

16. A program product according to claim 15 wherein said network is the internet and uses TCP/IP and hypertext transmission protocols, and said data includes pages identified by universal resource locator addresses.

17. A program product according to claim 16 wherein said indication is generated based on size of said data, loading at said server, and transmission bandwidth for said server.

18. A program product according to claim 17 wherein said transfer method includes a plurality of alternatives, said alternatives including immediate transfer, delayed transfer, and aborting transfer.

19. A program product according to claim 15 wherein said data includes a page of hypertext, and said indication is sent to said user station by said server for all links in said hypertext.

20. A program product according to claim 19 wherein said user station sends instructions to said server for each of said links in said hypertext.

* * * * *